US009481065B2

(12) United States Patent
Mang et al.

(10) Patent No.: US 9,481,065 B2
(45) Date of Patent: Nov. 1, 2016

(54) TELESCOPIC PROTECTIVE COVERING

(75) Inventors: Wolf-Matthias Mang, Obertshausen (DE); Thomas Kreutzer, Darmstadt (DE)

(73) Assignee: ARNO ARNOLD GMBH, Obertshausen (DE)

( * ) Notice: Subject to any disclaimer, the term of this patent is extended or adjusted under 35 U.S.C. 154(b) by 507 days.

(21) Appl. No.: 13/876,091

(22) PCT Filed: Sep. 28, 2011

(86) PCT No.: PCT/DE2011/001784
§ 371 (c)(1),
(2), (4) Date: Apr. 5, 2013

(87) PCT Pub. No.: WO2012/041293
PCT Pub. Date: Apr. 5, 2012

(65) Prior Publication Data
US 2013/0186577 A1     Jul. 25, 2013

(30) Foreign Application Priority Data
Sep. 28, 2010   (DE) .................... 20 2010 013 677 U

(51) Int. Cl.
*E06B 3/12* (2006.01)
*E06B 9/00* (2006.01)
*B23Q 11/08* (2006.01)

(52) U.S. Cl.
CPC ... *B23Q 11/0825* (2013.01); *B23Q 2011/0808* (2013.01)

(58) Field of Classification Search
CPC .............. F16P 1/00; F16P 1/005; F16P 1/02; F16P 3/02; F16C 29/08; B23Q 11/08; B23Q 11/0816; B23Q 11/0825; B23Q 2011/0808
USPC ......... 160/202, 218, 220, 222, 223, 84.01,160/84.03, 84.08; 409/134; 74/608, 612, 74/613
See application file for complete search history.

(56) References Cited

U.S. PATENT DOCUMENTS 3,788,377 A *  1/1974  Knowles .................... 160/84.04
4,596,162 A *  6/1986  Walter et al. ................... 74/608
(Continued)

FOREIGN PATENT DOCUMENTS

DE        201 08 661 U1    10/2001
DE     103 08 024 Al         9/2004
(Continued)

OTHER PUBLICATIONS

PCT Translation of the International Preliminary Report on Patentability, PCT/DE2011/001784, Apr. 11, 2013.
(Continued)

*Primary Examiner* — Katherine Mitchell
*Assistant Examiner* — Jeremy Ramsey
(74) *Attorney, Agent, or Firm* — Quarles & Brady LLP

(57) ABSTRACT

The invention relates to a protective covering comprising a plurality of substantially L-shaped protective covering segments (2, 16) comprising a cover leg (3, 17) and a support leg (4, 18) which are arranged relative to one another in such a way that they are telescopically slidable with respect to one another, wherein the cover legs (3, 17) of adjacent protective covering segments (2, 16) each come to bear on one another thus forming an overall substantially closed surface, and comprising at least one band-shaped or web-shaped flexible connecting element (5, 31) which connects the support legs (4, 18) of the protective covering segments (2, 16) with each other so as to at least transfer a tensile force. Disposed on each of the support legs (4, 18) is at least one elastic reset element (11, 32) such that said element is fastened with its first end to the support leg (4, 18) and abuts with its second end with prestressing against a section of the connecting element (5, 31) so as to urge said section in the direction of the support leg (4, 18).

20 Claims, 8 Drawing Sheets

(56) References Cited

U.S. PATENT DOCUMENTS

| | | | |
|---|---|---|---|
| 8,763,673 B2* | 7/2014 | Jelic et al. | 160/84.05 |
| 2006/0102296 A1* | 5/2006 | Wu | 160/223 |
| 2007/0230836 A1* | 10/2007 | Schirling | 384/15 |

FOREIGN PATENT DOCUMENTS

| JP | 2008012639 A | 1/2008 |
|---|---|---|
| WO | WO 2012175232 A1 * | 12/2012 |

OTHER PUBLICATIONS

International Search Report as mailed on Feb. 23, 2012 for International Application No. PCT/DE2011/001784.

Japan Patent Office, Notice for a Reason of Rejection, Application No. 2013-530565, Mar. 27, 2015.

* cited by examiner

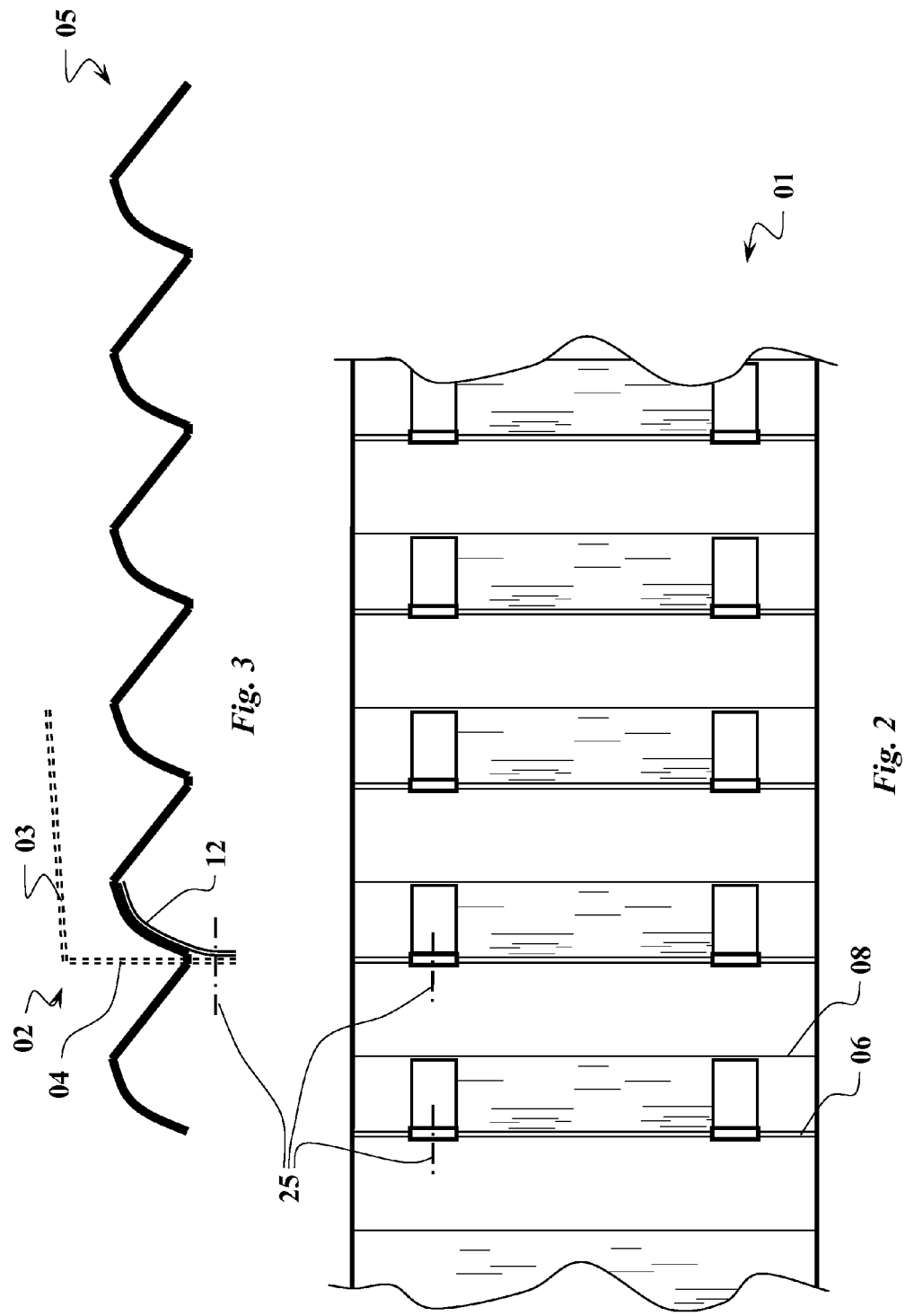

TELESCOPIC PROTECTIVE COVERING

CROSS-REFERENCE TO RELATED APPLICATIONS

This application represents the national stage entry of PCT International Application No. PCT/DE2011/001784 on Sep. 28, 2011 and claims the benefit of German Utility Model Application No. 20 2010 013 677.6 filed Sep. 28, 2010. The contents of both of these applications are hereby incorporated by reference as if set forth in their entirety herein.

The present invention relates to a protective covering according to the preamble of claim 1.

Protective coverings of the mentioned type serve the purpose, for example in tool machines, of securing mobile parts, such as drives, against an unintentional access of a user of the machine and of closing off the operating space of the tool machine in a manner which prevents chippings or other parts and particles from leaving the machine in a way that might endanger the user. For this purpose, common protective coverings comprise protective covering segments in the form of L-shaped metal sheets which telescopically engage one behind the other with one of their legs, thus forming a substantially closed cover. However, since the overlapping legs in particular lie only loosely on top of one another, either no sufficiently sealed closure is possible or constructively expensive supplementations have to be implemented. Hence, generic protective coverings are regularly provided with closed bellows on the rear side so as to ensure a relatively sealed closure. This, however, makes the production of such a protective covering elaborate and expensive. Additionally, the weight of the protective covering is substantially increased so that longer protective coverings cannot be moved with the necessary speed due to their high weight.

Based on this state of the art, it is the object of the present invention to provide a protective covering which provides for a secure closing while having a relatively low weight.

This object is attained by a protective covering according to the teaching of claim 1.

Advantageous embodiments of the invention are the subject matter of the dependent claims.

The protective covering according to the present invention comprises in a manner known per se a plurality of substantially L-shaped protective covering segments with a cover leg and a support leg. Said protective covering segments are to be arranged relative to each other in such a manner that they are telescopically slidable against each other, wherein the cover legs of adjacent protective covering segments respectively come to bear on one another, thus forming an overall substantially closed surface. Further, at least one band-shaped or web-shaped flexible connecting element is provided which connects the support legs of the protective covering segments with each other so as to at least transfer a tensile force.

According to the invention, at least one elastic reset element is respectively arranged on the support legs in such a manner that it is fastened with its first end to the support leg and abuts with its second end with prestressing against a section of the connecting element, pushing it into the direction of the support leg.

Due to this prestressing, a momentum is induced onto the protective covering segment by the connecting element via the reset element arranged on the support leg, which leads to the telescopically overlapping cover legs being pushed against each other, which results in a secure overall closure of the protective covering. Said momentum rises the further the protective covering is extended.

The realization of the connecting element is basically optional as long as, firstly, the force necessary for extension is transferrable and, secondly, a force is transferrable to the reset element when extending the protective covering. According to a preferred embodiment of the invention, however, the connecting element is formed like an accordion in the manner of bellows with folded edges parallel to the longitudinal edges of the legs of the protective covering segments, wherein between two adjacent protective covering segments or between the support legs of two adjacent protective covering segments, at least one fold of the connecting element is arranged such that a first folded edge overlaps or comes to rest on the edge of the support leg of a protective covering segment, a second folded edge overlaps or comes to rest on the edge of the support leg of the adjacent protective covering segment and the interposed folded edge forms the bottom of the fold.

The material of the connecting element can, for example, be a textile material, such as a polyester tissue in the manner of classic bellows. Preferably, however, the connecting element is substantially made of an inherently rigid plastic material, in particular of polypropylene (PP) or the like. In this case, firstly, the necessary force can be more easily transferred to the reset element when extending the protective covering and, secondly, this results in the fact that, when extending and retracting the protective covering, the applied pulling and pushing forces are transferred not only to one protective covering segment, respectively, but to all or at least several protective covering segments at once. This results in a substantially more even extension and retraction as compared to the classic bellows.

The material thickness here substantially depends on the used material. Preferably, in particular if using PP, the material thickness is between 0.3 and 1.5 mm, preferably between 0.5 and 1.0 mm.

For connecting the connecting element and the support frame or protective covering segment, the longitudinal edges of the support legs of the protective covering segments each comprise at least one preferably integrally formed flap. Said flap therein substantially protrudes in the leg plane beyond the longitudinal edge, wherein the connecting element is provided with slit-type recesses in the region of its folded edges, which edges rest on the edge of the support leg or overlap the support leg, the flaps reaching through said recesses. Due to this realization, the pulling and pushing forces applied when extending and retracting the protective covering are transferred to the protective covering segments via the connecting elements.

The reset element can basically be arranged in any optional manner in any optional spot on the support leg. However, the reset element preferably comprises at least one flap-type tongue which in the region of its first end is fastened to one of the flaps on the support leg of a protective covering segment. With its free opposite end, on the side of the support leg which faces towards the cover leg of the same protective covering segment, the flap-type tongue protrudes in the direction of the bottom of the fold of the connecting element. In other words, according to this embodiment, the flap on the support leg at the same time serves for connecting the support leg to the connecting element and to the reset element.

Therein the connection of the reset element to the flap can be made, for example, by means of riveting, screwing, gluing or any other connecting method. According to a particularly preferred embodiment of the invention, however, the fastening of the reset element is realized in the manner of a clip or snap-on connection.

According to a further embodiment, the flaps can comprise a slit-type recess open towards a lateral edge of the flap. The first ends of the flap-type tongue of the reset element can be provided with a locking element which is introducible into the recess of the flap so as to partially engage behind it. Thereby, a secure and detachable connection between the reset element and the support frame can be achieved in a simple manner.

According to an embodiment, the locking element can be formed integrally on the flap-type tongue. Herein, the locking element has a first region which is slidable into the recess of the flap and a second region to which at least partially protrudes beyond the first region, thus forming an edge, wherein said edge lies opposite the first end of the flap-type tongue with a distance, said distance substantially corresponding to the thickness of the flap. Such an integral locking element can be produced in a simple manner, for example by injection molding.

In an alternative embodiment, the locking element can be formed as a separate holder. In that case, said holder is provided with an abutment surface and a base region. Here the flap-type tongue of the reset element in the region of its first end comprises a recess through which the holder can be pushed with its base region. Herein, the base region preferably comprises a slit-type recess with which the holder can be slid into the slit-type recess of the flap, partially overlapping it, the first region of the flap-type tongue of the reset element being arranged between the abutment surface and the flap of the protective covering segment. One advantage of this embodiment is in particular that the flap-type tongue and the holder can be manufactured from different materials.

In order to make possible in particular a pre-assembly of the reset element with the flap-type tongue and the holder, the base region and/or the recess comprise a clamping or snap-on fastening device with which the holder can be fixed in the recess of the flap-type tongue. This can for example be realized in that the region of the holder reaching through the recess in the flap-type tongue is a little larger than the recess. This results in a captive fixation of the holder in the tongue.

In the simplest case, the flap-type tongue is formed as a substantially even surface so that a planar abutment on the connecting element is realized. According to another embodiment, however, the flap-type tongues are formed concave or convex in one or in both axis directions or comprise contact elements protruding in the form of a point or a line on their surface facing the connecting element. Thereby, a punctual or linear force transfer can be achieved. It is also conceivable to form the ends of the flap-type tongue flap finger-shaped or fan-shaped.

According to a further embodiment, the upper edges of the flap-type tongues and/or of the locking elements, in particular of the abutment surfaces of the holders, said upper edges facing away from the longitudinal edge of the support leg, can protrude at least slightly beyond the upper edge of the flaps arranged on the support legs of the protective covering segments and can be realized as sliding surfaces. Thus, an additional support of the protective covering can be realized in a simple manner.

In a basically optional manner only one flap can be arranged on each support frame. Preferably, however, according to another embodiment, at least two flaps are arranged. In this way, for example, two or more reset elements can be employed and, thus, larger reset forces or momentums can be transferred. Herein, it is particularly advantageous if the reset elements of adjacent protective covering segments are arranged on flaps offset against each other and, thus, are arranged offset themselves. This results in an improved packaging when the protective covering is retracted. In other words, the protective covering can be retracted further.

The reset element or the flap-type tongue of the reset element can basically be made of any optional material as long as the necessary forces can be transferred and a sufficient elasticity is provided. For example, the reset elements or the flap-type tongue can be made of metal, in particular of spring steel. According to a preferred embodiment of the invention, however, the flap-type tongue of the reset element is substantially made of a plastic material or plastic compound material, in particular of a thermoplastic elastomer TPE. Thus, elasticity as well as rigidity, in particular permanent rigidity, is provided.

For the locking element or for the holder, plastic material or plastic compound material, in particular a polyoxymethylene (POM), can be to used. Compared to TPE, this material exhibits a higher rigidity and hardness.

In the case of an integral reset element, said reset element can also be injection-molded from two different materials, wherein, for example, the tongue can be made of TPE and the locking element can be made of POM.

In a manner well-known per se, the protective covering according to the invention can comprise an extension limitation device, in particular in form of a band-type lock, and/or bellows which are arranged on the rear side of the protective covering.

The lateral edges of the connecting elements can be formed straight. According to one embodiment, in the region between the support legs of adjacent protective covering segments, the lateral edges which extend vertically to the folded edges can be folded towards the inside in the manner of a folded corner. Herein, said folded corners can in particular form an elastic abutment cushion which prevents the adjacent protective covering segments from directly colliding when the protective covering is being retracted.

In the following, the invention is explained in more detail with reference to the drawings merely showing exemplary embodiments.

FIG. 1 in a perspective schematic illustration shows a first exemplary embodiment of a protective covering according to the invention;

FIG. 2 shows the protective covering according to FIG. 1 in a view from below;

FIG. 3 in a lateral view shows the connecting element of the protective covering according to FIGS. 1 and 2, wherein one protective covering segment is indicated with dotted lines and an elastically deformed or prestressed reset element is illustrated;

FIG. 4 in a schematic perspective illustration shows a second exemplary embodiment of a protective covering according to the invention;

FIG. 5 in an enlarged illustration shows the section A of the protective covering illustrated in FIG. 4;

FIG. 6 shows the protective covering according to FIG. 4 in the retracted state;

FIG. 7 in a perspective illustration shows a protective covering segment of the protective covering according to FIG. 4;

FIG. 8 in an enlarged illustration shows a flap of the protective covering segment according to FIG. 7;

Figure 1:
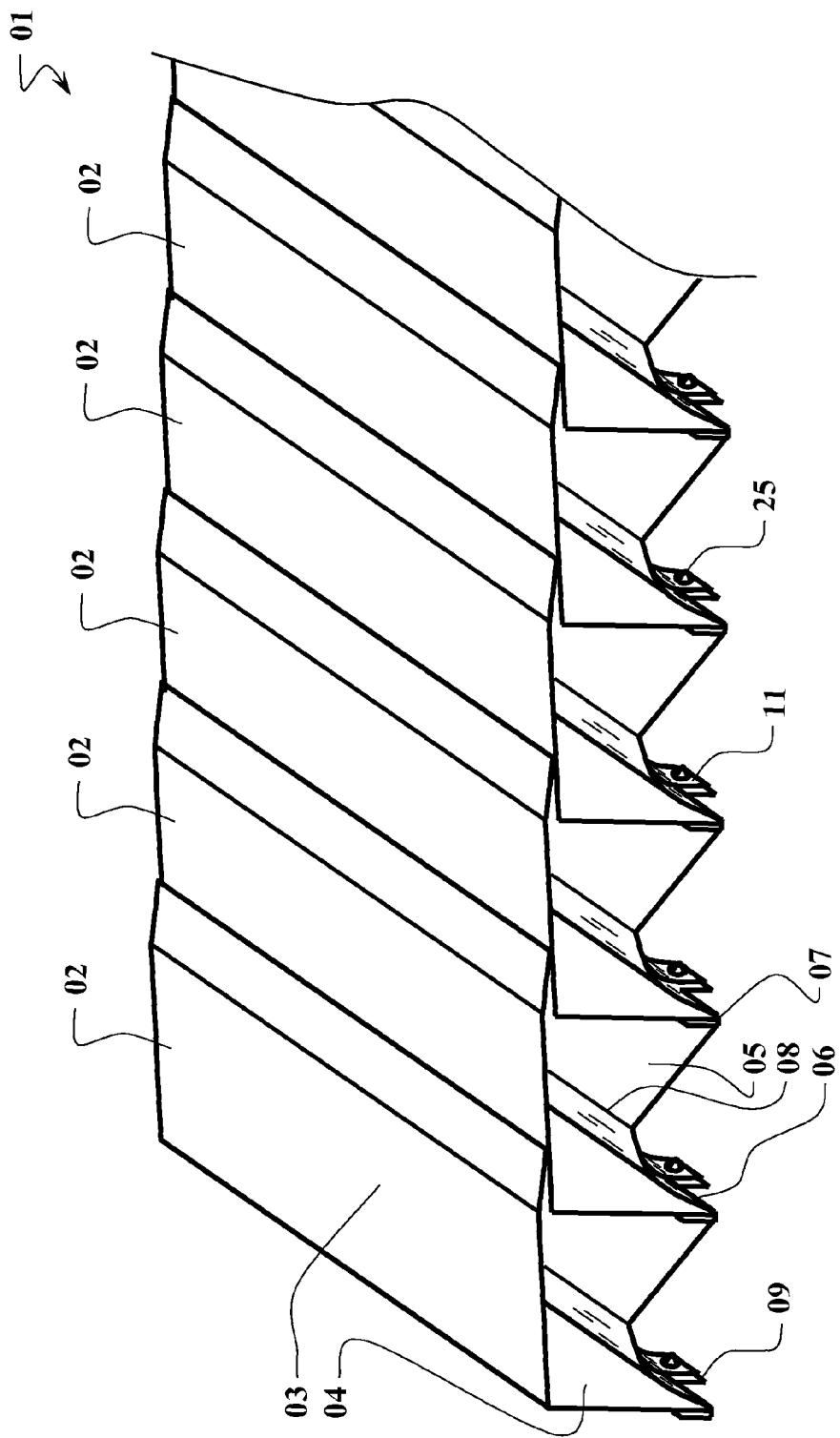

The protective covering 1 illustrated in FIG. 1 comprises a plurality of protective covering segments 2, which are manufactured from a sheet metal material, for example from stainless steel. The protective covering segments 2 are each formed substantially L-shaped and each comprise a cover leg 3 and a support leg 4. The protective covering segments 2 therein are arranged relative to one another in such a manner that they are telescopically slidable against each other, wherein the cover legs 3 of adjacent protective covering segments 2 respectively come to bear on one another, forming an overall substantially closed surface.

The protective covering segments 2 in the illustrated exemplary embodiment are connected via a flexible connecting element 5 in the shape of a web of an inherently rigid plastic material, in particular a polypropylene (PP), in such a manner that in the occurrence of a tensile load, the protective covering segments 2 are displaced so as to extend or shorten the protective covering 1, wherein the connecting element 5 serves not only for the transfer of pulling and pushing forces, but also as an extension limitation device so as to prevent that two adjacent protective covering segments 2 or their cover legs 3 come into a position in which they no longer engage behind each other or overlap telescopically. In the exemplary embodiment shown in FIG. 1, the connecting element 5 extends across the entire width of the protective covering 1.

The connecting element 5 is substantially realized in the form of bellows in the manner of an accordion with folded edges parallel to the longitudinal edges of the legs 3, 4 of the protective covering segments 2, wherein between two adjacent protective covering segments 2 or between the support legs 4 of two adjacent protective covering segments 2, a fold of the connecting element 5 is arranged such that a first folded edge 6 overlaps or rests on the edge of the support leg 4 of a protective covering segment 2, a second folded edge 7 overlaps or rests on the edge of the support leg 4 of an adjacent protective covering segment 4 and the interposed folded edge forms the bottom of the fold 8, which faces towards the cover legs 3 of the protective covering segments 2. In other words, between two respectively adjacent protective covering segments 2, one fold is formed which opens substantially in a V-shaped manner from the cover legs 3 of the protective covering segments 2.

The edges of the support legs 4 of the protective covering segments 2 are each provided with two flaps 9 which protrude beyond the edge in the support leg plane. In the same arrangement as the flaps 9 on the protective covering segments 2, the edges of the folded edges of the connecting element 4, which overlap or rest on the support legs 3, are provided with slit-type recesses 10, the flaps 9 reaching through said recesses.

On the flaps 9, reset elements 11 are further arranged, respectively. They comprise a flap-type tongue 12 which is made of an at least slightly elastic material, in this case of a thermoplastic elastomer TPE with a material thickness of 0.6 mm. The flap-type tongue 12 with its first end is fastened to the corresponding flap 9 of the respective protective covering segment 2, is riveted (25) to it in the illustrated exemplary embodiment.

With its free ends, the flap-type tongues 12 protrude into the bottom of the fold 8 of the connecting element 5 on the side of the support leg 4 facing towards the cover leg 3 of the same protective covering segment 2 and abut with at least slight elastic deformation or prestressing against the inner wall of the fold. Due to this prestressing or elastic bending deformation of the flap-type tongue 12, firstly, an elastic reset force can be generated against the direction of extension when extending the protective covering 2 and, secondly, a momentum on the individual protective covering segments can be generated which results in the cover legs 3 of respectively adjacent protective covering segments being pushed against each other. Herein, said momentum rises when the protective covering segments 2 are extended due to the increasing elastic bending deformation of the flap-type tongues 12.

The exemplary embodiment illustrated in FIGS. 4 to 10 of a protective covering 15 according to the invention substantially presents the same structure as the exemplary embodiment illustrated in FIGS. 1 to 3. The protective covering 15 again comprises a multitude of protective covering segments 16. They are illustrated in more detail in FIGS. 7 and 8. The protective covering segment 16 is formed substantially L-shaped with a cover leg 17 and a support leg 18. On the edge 19 of the support leg 18, two flaps 20 and 21 are integrally formed, which serve for the fastening of one reset element each in the manner described as follows.

The two flaps 20, 21 each comprise a slit-type recess 22 open towards a lateral edge of the flap 20, 21. In the region of its opening towards the lateral edge, the recess has a slanted area 23 which in particular facilitates the insertion of the reset element.

Contrary to the exemplary embodiment according to FIGS. 1 to 3, the reset elements of the exemplary embodiment shown in FIGS. 4 to 10 are not riveted to the flaps 20, 21, but are connected to the flaps 20, 21 in a form-fitting manner, in particular in the manner of a clip or snap-on connection.

Figure 10:
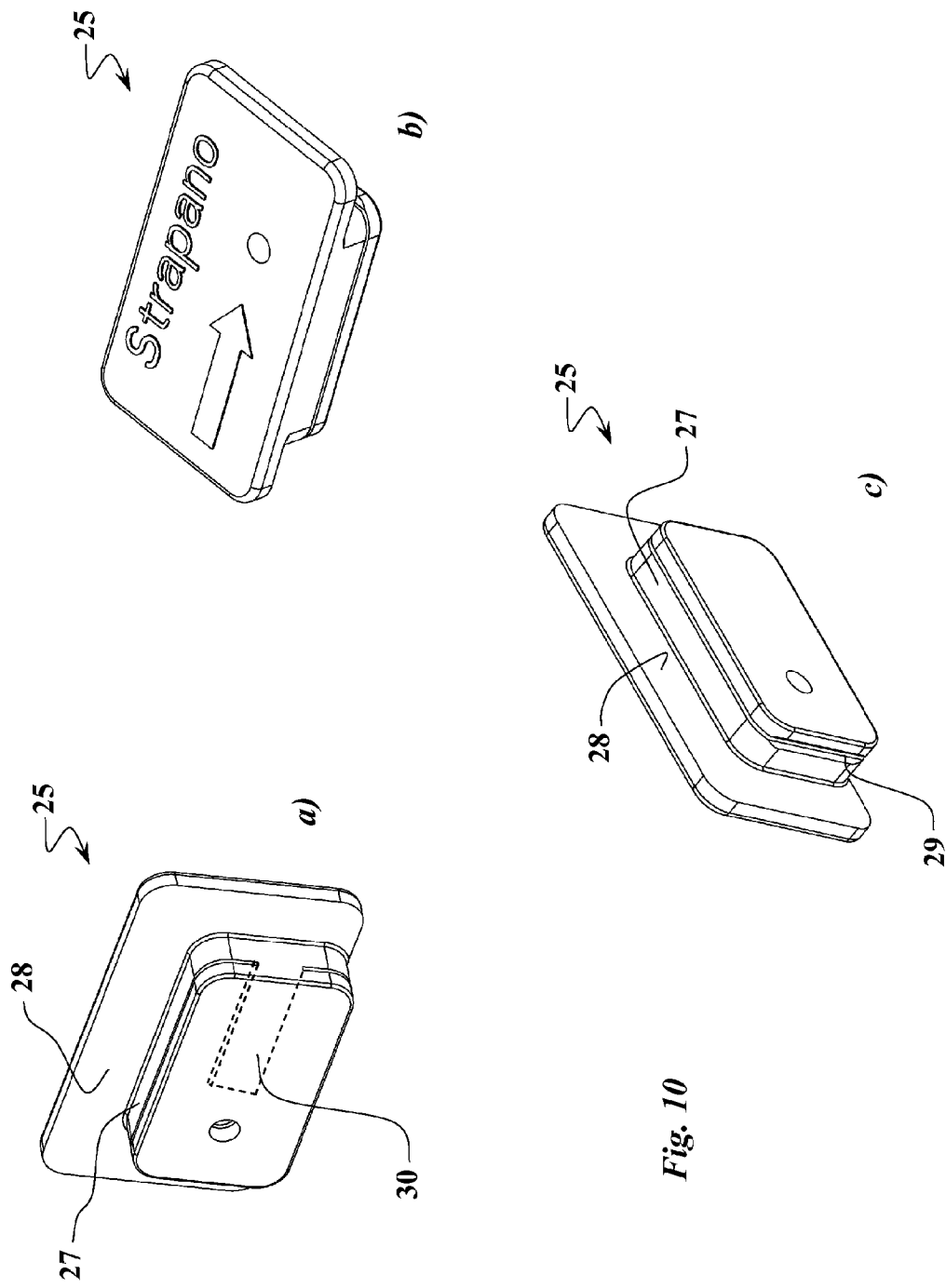
FIG. 10 shows the holder of a reset element of the protective covering according to FIG. 4.

The reset element of this exemplary embodiment is formed in two pieces with a flap-type tongue 24 (FIG. 9) and a locking element in the form of a holder 25 (FIG. 10).

The flap-type tongue 24 is initially formed as an even plate (FIG. 9a) and in this exemplary embodiment it is made of an elastic thermoplastic elastomer (TPE) with a material thickness of 0.6 mm. In the region of the first end, the flap-type tongue 24 comprises a window-type continuous recess 26. In FIG. 9b, the tongue 24 is shown in its assembled state, i.e. elastically deformed and, thus, prestressed.

The holder 25 is substantially made of a material with higher rigidity and hardness; in the exemplary embodiment shown here it is made of a polyoxymethylene (POM). The holder 25 has a base region 27 and an abutment surface 28, wherein the base region 27 is integrally formed on the abutment surface 28. The peripheral outline of the base region 27 substantially corresponds to the outline of the recess 26 in the tongue 24 so that the holder 25 can be pushed with its base region 27 into the recess 26 in the direction of the arrow F until the abutment surface 28 abuts against the surface of the tongue surrounding the recess 26. Due to the base region being slightly bigger compared to the recess 26, the holder is thereby held captive in the recess.

The base region 27 comprises a slit-type recess 29. Said recess therein extends in a plane which runs parallel to the abutment surface 28 with a distance corresponding to the material thickness of the tongue 24. The width of said slit-type recess 29 therein substantially corresponds to the material thickness of the flap 20, 21 on the support leg 18. Said recess 29 is formed substantially U-shaped. The region 30 between the two legs of the U therein substantially corresponds to the width of the slit-type recess 22 in the flap 20, 21.

For assembling the protective covering 15 according to the invention, first, the connecting element 31 formed like bellows is pushed with its recesses formed in the folded edges onto the flaps 20, 21 of the protective covering segment 16 so that the folded edge comes to bear on the edge of the support leg 18. Then, the reset element as described above, comprised of the holder 25 and the tongue 24, is slid laterally into the flap, wherein the region 30 of the holder 25 is inserted into the recess 22 of the flap 20, 21 and the abutment surface 28 of the holder from the one side and the region of the tongue 24 surrounding the recess 26 from the other side come to rest against the flap 20, 21, enclosing it.

Figure 4:
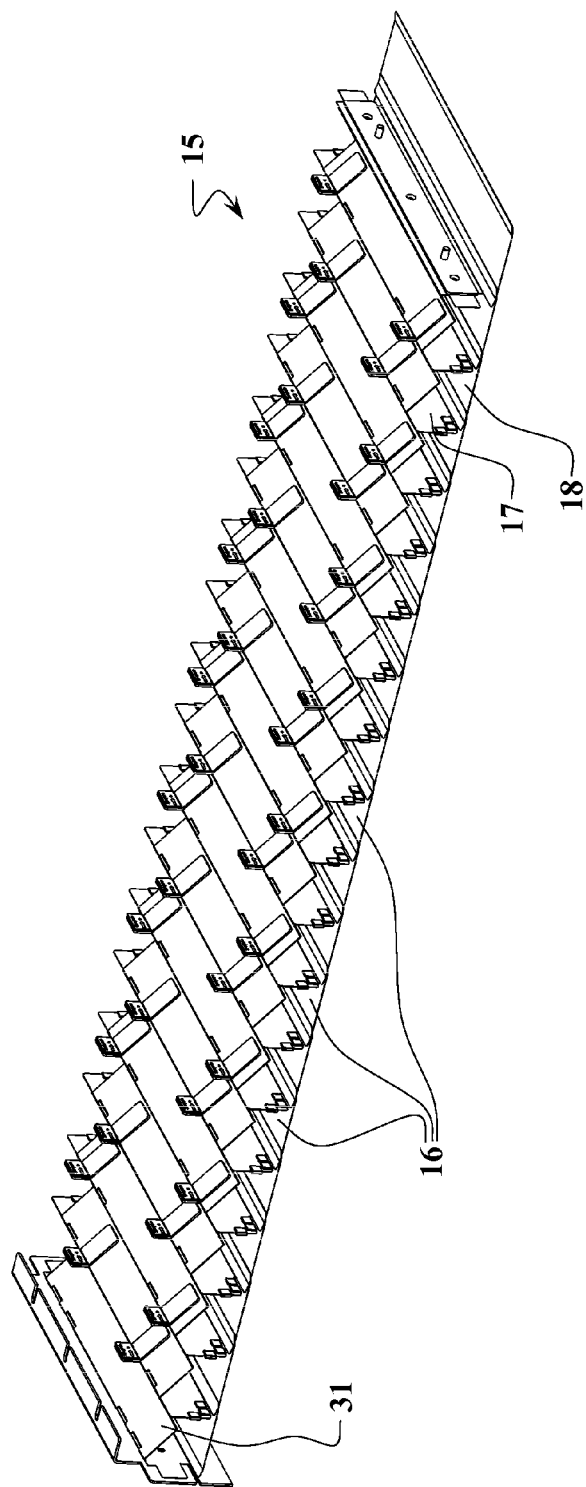
Figure 5:
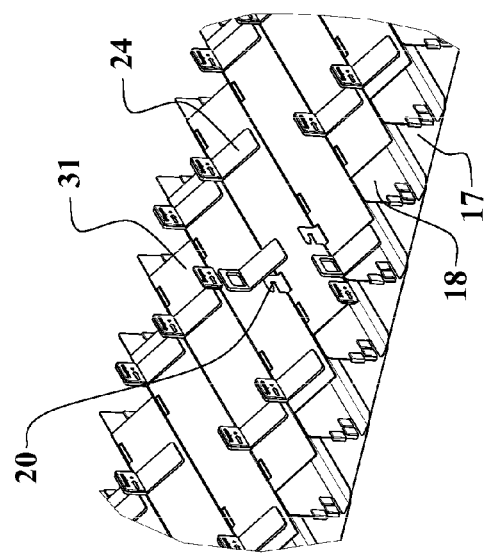
Figure 6:
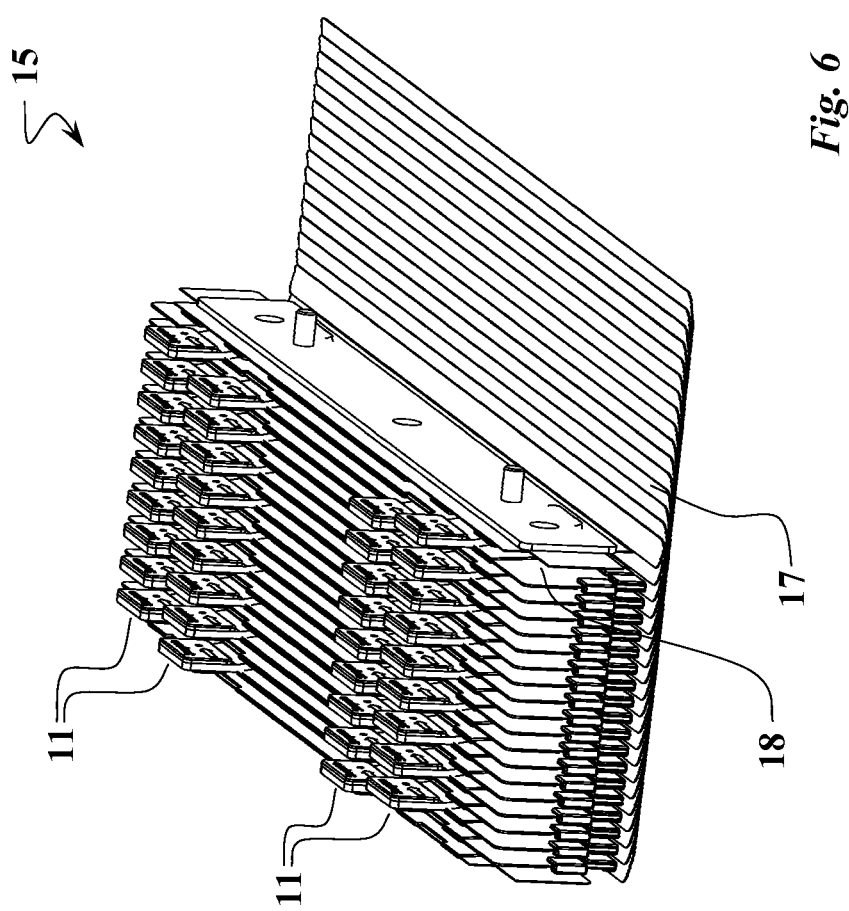
Figure 8:
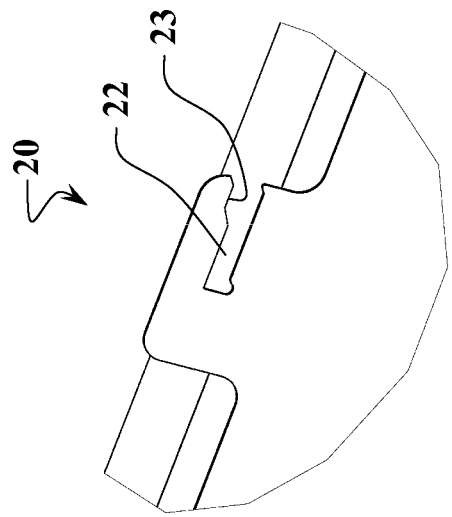
Figure 7:
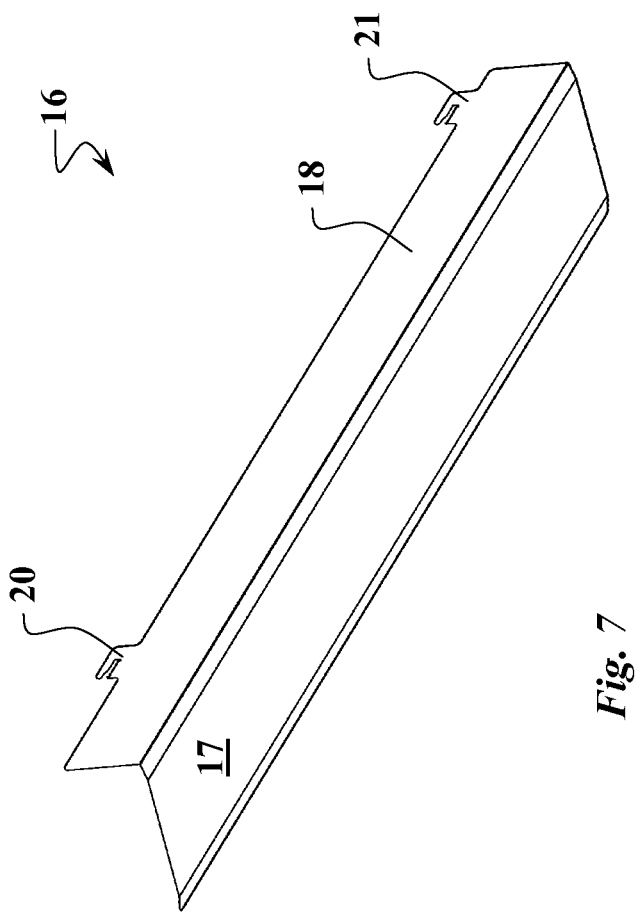
Figure 9:
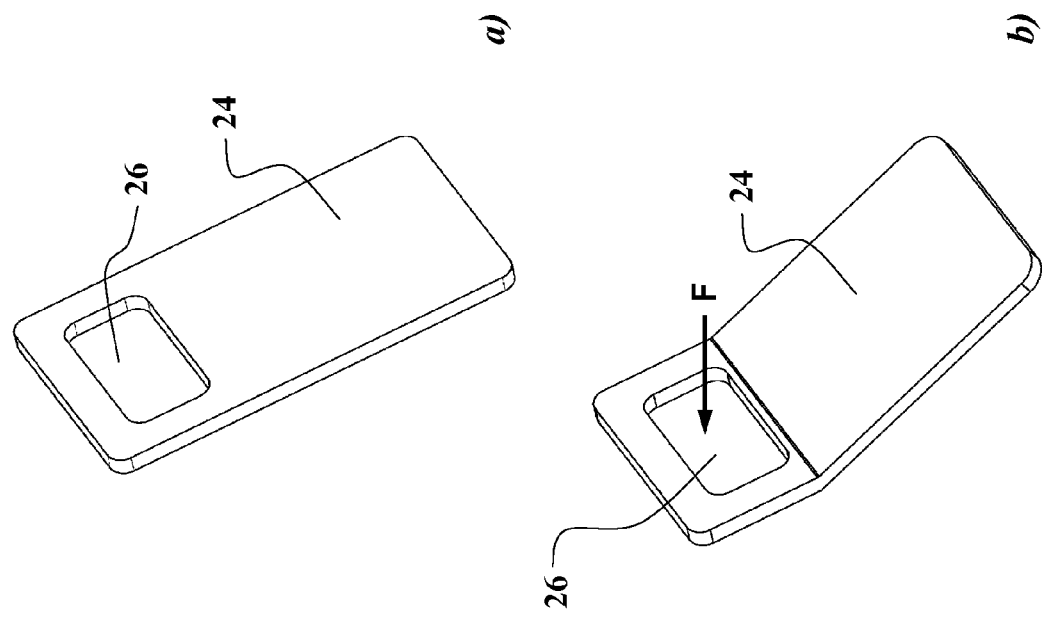
FIG. 9 shows the flap-type tongue of a reset element of the protective covering according to FIG. 4.

As can be taken in particular from FIGS. 4, 5 and 6, in the exemplary embodiment illustrated there, the reset elements of adjacent protective covering segments 16 are laterally offset against each other. This allows for a particularly narrow packaging of the protective covering segments 16 when the protective covering is being retracted as is illustrated in FIG. 6. For this purpose, the respective flaps of adjacent protective covering segments are arranged offset against each other. However, it is equally possible that the flaps of adjacent protective covering segments are arranged identically, i.e. in particular aligned, wherein, however, the reset elements are not arranged on flaps which are arranged one directly behind the other, but are arranged offset in relation to one another. Thus, for example on each 1, 3, 5 etc. protective covering segment, a reset element can be arranged on a first and a third flap, respectively, and on each 2, 4, 6 etc. protective covering segment on a second and fourth flap, respectively.

Figure 11:
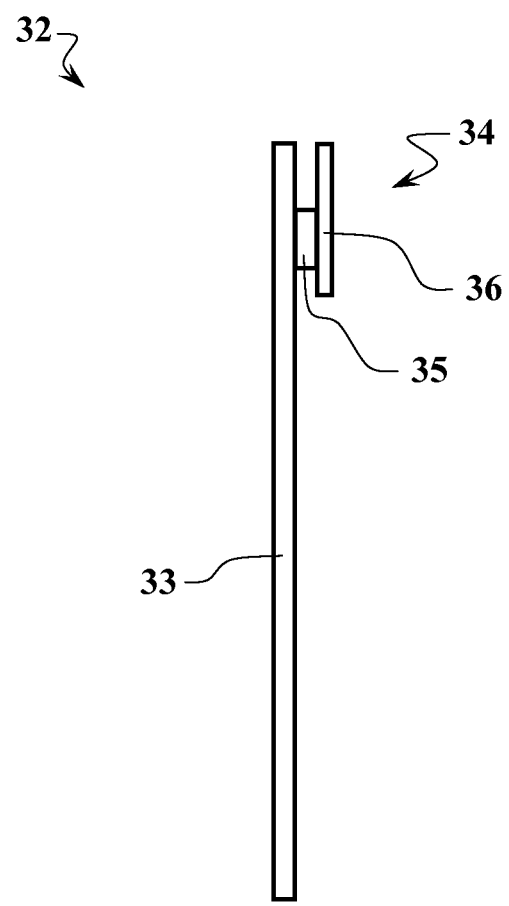
FIG. 11 shows a further exemplary embodiment of a reset element for a protective covering according to the invention in a lateral view.

In FIG. 11, a further implementation example of a reset element 32 is illustrated. Said reset element is realized integrally and comprises a flap-type tongue 33 and a locking element 34. The locking element 34 is substantially comprised of a first region 35 which is slidable into the recess 22 of the flap, and of a second region 36 which protrudes beyond the edge of the region 35. The distance between the surface of the tongue 33 facing towards the locking element and the surface of the region 36 facing towards the tongue therein substantially corresponds to the material thickness of the flap 20, 21.

The invention claimed is:

1. A protective covering comprising:
  a plurality of substantially L-shaped protective covering segments, each covering segment having a cover leg and a support leg, said covering segments being telescopically slidable with respect to one another, wherein the cover legs of adjacent protective covering segments respectively come to bear on one another thus forming a substantially closed surface;
  at least one flexible connecting element connecting the support legs of the protective covering segments with each other so as to at least transfer a tensile force; and
  at least one elastic reset element having a first terminal end and a second terminal end, said first end fastened to the support leg of one of the plurality of covering segments and said second end prestressing directly against a section of the at least one flexible connecting element, pushing said section in a direction of the support leg, such that a momentum is induced onto the protective covering segment by the connecting element via the reset element arranged on the support leg, the momentum leading to telescopic overlapping of the covering segments.

2. The protective covering according to claim 1, in which the at least one flexible connecting element includes a plurality of folded edges parallel to longitudinal edges of the cover legs or the support legs of the protective covering segments, wherein a first fold of the connecting element is arranged between at least one of the covering segments and the support legs of first and second adjacent protective segments such that a first folded edge overlaps or rests on an edge of the support leg of the first adjacent protective covering segment, a second fold is arranged such that a second folded edge overlaps or rests on the edge of the support leg of the second adjacent protective covering segment and an interposed folded edge forms the bottom of the fold of the connecting element.

3. The protective covering according to claim 1, in which the at least one flexible connecting element is substantially comprised of an inherently rigid plastic material.

4. The protective covering according to claim 1, in which a material thickness of the connecting element is between 0.3 and 1.5 mm.

5. The protective covering according to claim 1, in which the support legs of the protective covering segments each includes a longitudinal edge with at least one flap formed thereon, said at least one flap substantially protruding beyond the longitudinal edge in a leg plane, wherein proximal folded edges of the at least one flexible connecting element rest on or overlap the edge of the support leg, and the at least one connecting element is provided with a recess, wherein the at least one flap extends through said recess.

6. The protective covering according to claim 5, in which the at least one reset element includes at least one tongue having a first end and a second end, said at least one tongue being fastened proximal the first end to said at least one flap on the support leg of a protective covering segment and said second end on a side of the support leg facing towards the cover leg of the same protective covering segment protruding in a direction of a bottom of fold of the connecting element.

7. The protective covering according to claim 6, in which the at least one reset element is fastened using at least one of a clip connection and a snap-on connection.

8. The protective covering according to claim 7, in which the at least one flap has a recess open towards a lateral edge of the at least one flap and the first end of the at least one tongue of the at least one reset element includes a locking element introduced into the recess of the at least one flap so as to partially engage behind the at least one flap.

9. The protective covering according to claim 8, in which the locking element is formed integrally on the at least one tongue, said locking element including a first region slidably inserted into the recess of the at least one flap, and a second region at least partially protruding beyond the first region and forming an edge lying opposite the first end of the at least one tongue a distance substantially corresponding to a thickness of the at least one flap.

10. The protective covering according to claim 8, in which the locking element is a separate holder with an abutment surface and a base region, and the at least one tongue of the at least one reset element has a recess proximal its first end, through which the holder can be pushed with its base region.

11. The protective covering according to claim 10, in which the base region has a recess with which the holder can be slid into the recess of the at least one flap), the first region of the at least one tongue of the at least one reset element being arranged between the abutment surface and the at least one flap of the protective covering segment.

12. The protective covering according to claim 10, in which at least one of the base region of the holder and the recess of the at least one tongue has a fastening device to which the holder can be fixed in the recess of the at least one tongue.

13. The protective covering according to claim 6, in which the at least one tongue is one of formed concave in at least one axial direction, formed convex in at least one axial direction.

14. The protective covering according to claim 8, in which an upper edge of at least one of the at least one tongue and the locking element facing away from the longitudinal edge of the support leg, protrudes beyond an upper edge of the at least one flap arranged on the support legs of the protective covering segments and are formed as sliding surfaces.

15. The protective covering according to claim 5, in which each support leg includes at least two flaps, wherein reset elements of adjacent protective covering segments are arranged on at least two flaps which are offset against one another.

16. The protective covering according to claim 6, in which the at least one tongue of the at least one reset element is substantially made of a plastic material.

17. The protective covering according to claim 6, in which a holder is substantially made of a plastic material.

18. The protective covering according to claim 1, wherein the at least one flexible covering element comprises an extension limitation device.

19. The protective covering according to claim 1, wherein the at least one flexible covering element comprises an bellows arranged on a rear side of the protective covering.

20. The protective covering according to claim 1, wherein the second end of the elastic reset element is free.

* * * * *